United States Patent [19]

Tsuzi et al.

[11] 4,135,874

[45] Jan. 23, 1979

[54] TWO STAGE COMBUSTION FURNACE

[75] Inventors: Shoichi Tsuzi, Hoya; Kiyoshi Aoki; Takeshi Sakai, both of Chiba; Hiroshige Ikebe, Kashiwa; Dogi So, Tokyo, all of Japan

[73] Assignee: Ishikawajima-Harima Jukogyo Kabushiki Kaisha, Ote, Japan

[21] Appl. No.: 748,884

[22] Filed: Dec. 9, 1976

[30] Foreign Application Priority Data

Apr. 8, 1976 [JP] Japan .................................. 51-38795
Mar. 31, 1976 [JP] Japan .................................. 51-35261

[51] Int. Cl.² .................................................. F23L 7/00
[52] U.S. Cl. ........................................................ 431/115
[58] Field of Search ................... 431/115, 116, 190, 9; 126/79; 110/49 R, 49 A

[56] References Cited

U.S. PATENT DOCUMENTS

| 1,310,173 | 7/1919 | Callery | 110/49 R |
| 3,743,471 | 7/1973 | Jaeger | 431/115 |
| 3,781,162 | 12/1973 | Rudd | 431/115 |
| 3,920,377 | 11/1975 | Yanuki et al. | 431/115 |

Primary Examiner—Edward G. Favors
Attorney, Agent, or Firm—Scrivener, Parker, Scrivener & Clarke

[57] ABSTRACT

Disclosed is a furnace whose NOx emission may be reduced to a minimum degree so far unattainable in any prior art furnaces by optimumly controlling the ratio of exhaust gas mixed with the combustion air to be supplied to the burners to the exhaust gas to be mixed with the two-stage combustion air which is admitted through air nozzles into the combustion chamber and also by optimumly controlling the distribution of the two-stage combustion air in the combustion chamber depending upon the operating conditions. The present invention may be applied to any types of furnaces.

1 Claim, 13 Drawing Figures

PRIOR ART

TWO STAGE COMBUSTION FURNACE

DETAILED DESCRIPTION OF THE INVENTION

In Japan, since 1975 the second antipollution standards have been enforced on the stationary sources of pollution in order to impose the restrictions on the emission of nitrogen oxides (NOx) into the atmosphere, and the more severe antipollution standards which will impose the restrictions on the total quantity of pollutant emissions are scheduled to be enforced in 1978. Then extremely severe restrictions will be imposed on the boilers which discharge a very large quantity of exhaust gas. Therefore extensive studies and experiments have been and are conducted in order to develop the equipment for minimizing the pollutants in the exhaust gas. However tremendous technical and economical advantages would be attained if the pollutant emissions could be controlled only by the improvements of the combustion methods. For instance, required is a furnace which would emit a very small quantity of NOx less than 20 ppm without the use of any antipollution equipment.

In order to reduce NOx in the exhaust gas discharged from boiler or other furnaces, the two-stage combustion method as well as the exhaust gas recirculation method have been widely used both alone and in combination.

In the two-stage combustion method, air in the amount less than a theoretical amount of air is usually supplied to the burner in order to restrict the production of NOx, and the two-stage combustion air is supplied at the downstream of the burner in order to attain the complete combustion. (In this specification, the term "two-stage combustion air" refers to the total volume of air supplied to the furnace minus the air supplied to the burner, and the two-stage combustion air is injected through the air nozzles arrayed at the downstream of the combustion zone.) In the secondary combustion; that is, the combustion with the two-stage combustion air, NOx are sometimes produced, but their quantity is very small and is considered negligible.

In the exhaust gas recirculation method, the exhaust gas at the upstream of the air heater of the boiler is forced to recirculate by the recirculation fan or the like and is mixed with the combustion air, thereby reducing the temperature of flames so as to control the evolution of NOx.

Figures 1, 2:
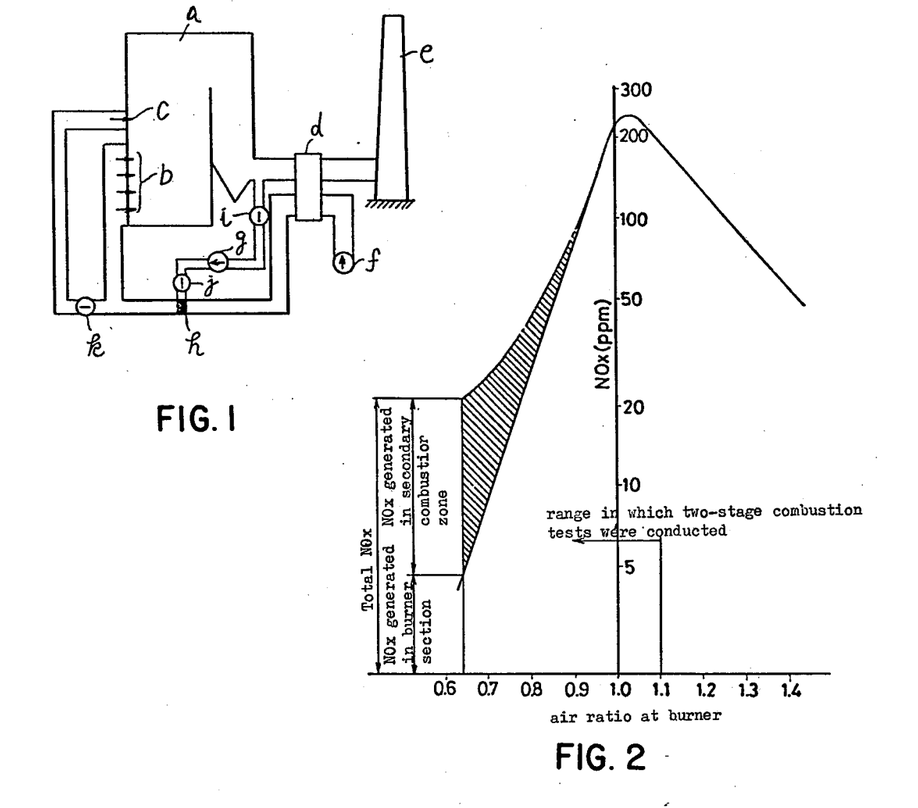
FIG. 1 is a diagrammatic view of a prior art boiler furnace.
FIG. 2 is a graph illustrating the relationship between the air ratio at the burner and the quantities of the nitrogen oxides (NOx) produced at the burner and in the secondary combustion zone in a two-stage furnace with a single burner.

In FIG. 1 there is shown one example of the prior art furnaces incorporating both the two-stage combustion method and the exhaust gas recirculation method. In FIG. 1, reference letter a denotes a boiler; b, burners; c, two-stage combustion air injection nozzles; d, an air preheater; e, a chimney; f, a forced draft fan; g, an exhaust gas recirculation fan; h, a gas mixer; and i, j, and k, dampers.

The fan f forces the air into the air preheater d where the air is heated. The preheated combustion air is mixed in the gas mixer h with the exhaust gas which is sucked at the upstream of the air preheater d and is forced by the exhaust gas recirculation fan g to flow into the mixer h. The mixed air is supplied to the burners b and the air nozzles c from which the air required for the second-stage combustion is injected into the boiler a. Since the combination of the two-stage combustion method and the exhaust gas recirculation method is employed, the generation of NOx may be more effectively suppressed than when one of the above methods is employed alone.

However, in order to minimize NOx by the two-stage combustion method, the air ratio must be of the order of 0.6 to 0.7 at the burner b. As a result, a large quantity of unburned compounds (mainly consisting of CO when hydrocarbon fuels are used) are produced. When such a large quantity of unburned compounds are burned with high heat release in the secondary combustion zone, a considerable quantity of NOx is produced. In some cases, the quantity of NOx produced in the secondary combustion zone occupies a substantial portion of NOx discharged from the chimney. The experimental results obtained by the inventor with a single burner and a model furnace are shown in FIGS. 2 and 3, respectively.

FIG. 2 shows the relationship between the quantity of NOx produced at or in the proximity of the burner and NOx produced in the secondary combustion zone. In this case the premixed gas burner was used and the total air supplied to the burner plus the air supplied to the secondary combustion zone was maintained with a constant air ratio of 1.1. It is seen that when the air ratio at the burner is less than 0.75, NOx produced in the secondary combustion zone is far greater in quantity than NOx produced at the burner.

Figure 3:
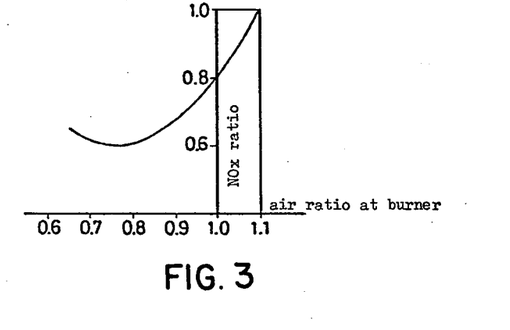
FIG. 3 is a graph illustrating the relationship between the air ratio at the burner and the ratio of the quantity of NOx to the base quantity of NOx produced under an air ratio at the burner of 1.1 in a model furnace with a plurality of burners.

FIG. 3 shows the relationship between the air ratio at the burner and the ratio of the quantity of NOx produced at the burner on model furnace, when the total air ratio is kept constant at 1.1, to the quantity of total NOx (that is, the sum of NOx produced in the secondary combustion zone and at the burner). It is seen that with the decrease in air ratio at the burner the total quantity of NOx decreases, but when the air ratio at the burner becomes lower than 0.8, the total quantity of NOx increases because NOx produced in the secondary combustion zone increases in excess of the decrease in NOx at the burner.

In summary, of NOx discharged from the combustion furnace, some are produced at or in the proximity of the burner and the remainder, in the secondary combustion zone, and the ratio between them varies depending upon the combustion conditions.

It is of cource true that the exhaust gas recirculation contributes to the reduction of NOx produced at the burner as well as in the secondary combustion zone. The recirculated exhaust gas may be mixed with the air both at the burner and the secondary combustion zone, but the quantity of exhaust gas to be supplied to the burner is somewhat restricted in order to ensure the stable combustion. In general, the upper limit of the volume of exhaust gas to be mixed with the primary air to be supplied to the burner is nearly 30%. Therefore in the combustion furnace shown in FIG. 1 wherein the combustion air and the exhaust gas are mixed at a predetermined ratio and supplied to both the burners b and the nozzles c, it is impossible to minimize NOx less than a certain level in the secondary combustion zone and consequently it becomes impossible to reduce the overall NOx emission less than a certain level.

Figure 4:
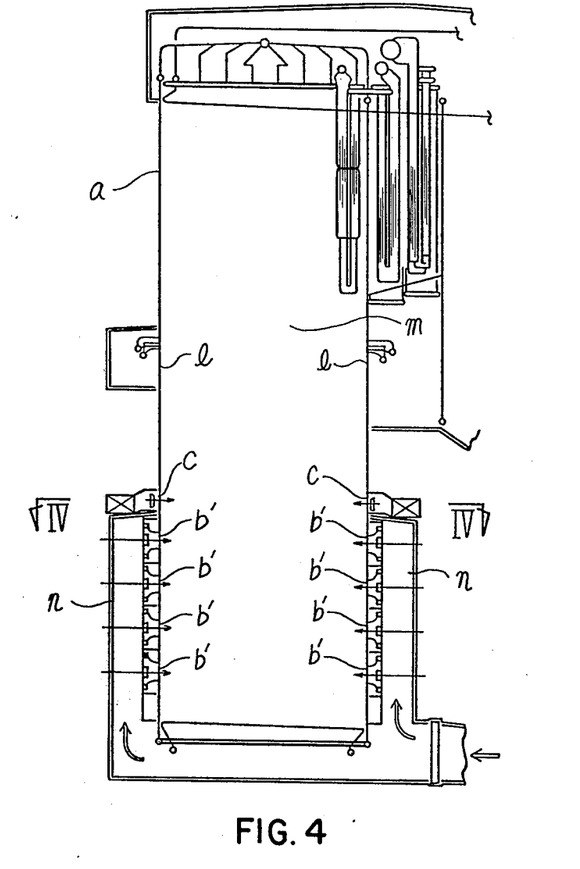
FIG. 4 is a schematic view of a prior art boiler furnace.
Figure 5:
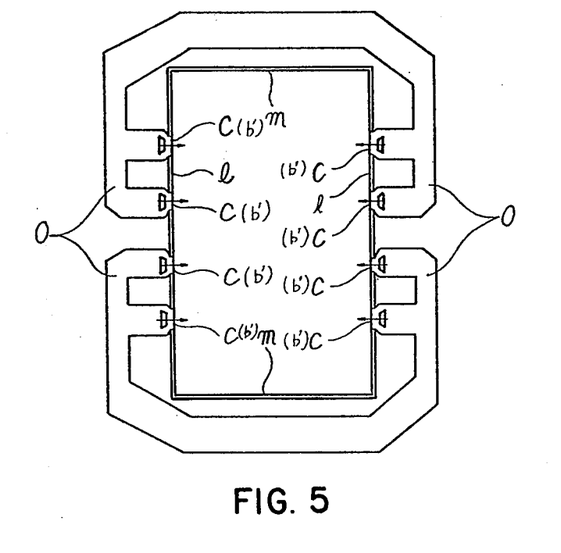
FIG. 5 is a sectional view taken along the line IV—IV of FIG. 4.

In FIGS. 4 and 5 there is shown one example of the prior art opposite fired furnace based on the two-stage combustion method. b' denotes burners; l, tube walls on the burner sides; m, side tube walls; n, a wind box opening at the burner section; o, ducts; and parts similar to those shown in FIG. 1 are designated by similar reference letters.

The two-stage combustion air nozzles c are opened through the tube walls l on the burner sides of the burners b and arrayed in columns and rows. The holes of the air nozzles c have the same diameter and are so arranged that they are perpendicular to the tube walls 1 on the burner sides.

Figure 6:
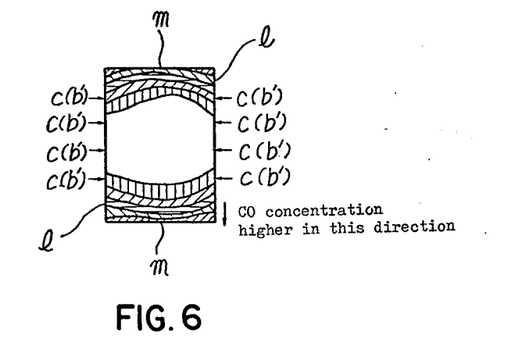
FIG. 6 shows the distribution of CO concentration during the staged combustion in the furnace shown in FIG. 4.

With this construction, NOx may be reduced to a certain lower level, but when the position and distribution of the injection of the two-stage combustion air are not suitable, a large volume of unburned materials are discharged from boiler. In the opposite-fired type furnace, the flows of the combustion gas collide or impringe against each other in the proximity of the center of the combustion chamber to be substantially redirected toward the side tube walls m. As a result, as shown in FIG. 6, CO concentration under two-stage combustion is higher in the vicinity of the side tube walls m. Therefore even when the two-stage combustion air is injected under these conditions, it remains in the proximity of the center of the combustion chamber so that it is not satisfactorily mixed with the combustion gas near the side tube walls m. The result is the delay in combustion of a large quantity of unburned compounds or the incomplete combustion thereof so that a large volume of unburned compounds are discharged, resulting in the decrease in thermal efficiency and the increased air pollution.

Figure 7:
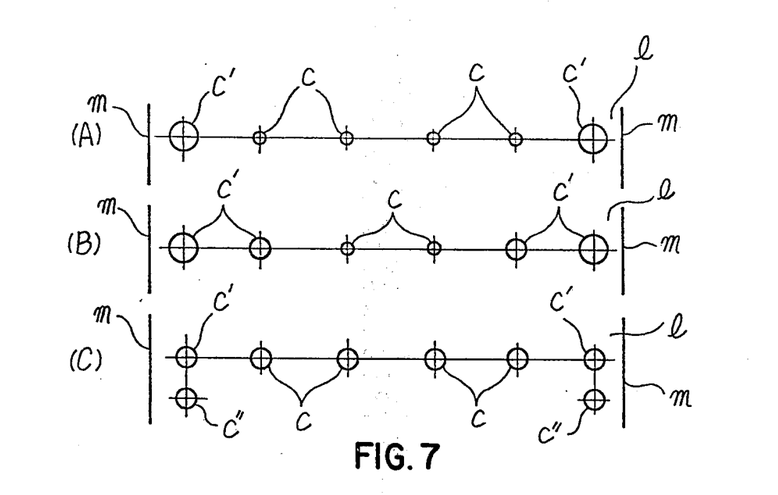

To overcome the above problems, there have been devised and demonstrated the furnaces wherein the diameter of the holes of the air nozzles most closely located to the side tube walls m is made substantially greater than the diameter of the other nozzles as shown in FIG. 7(A) or the diameter of the air nozzles c are gradually increased as the nozzles approach the side tube walls m as shown in FIG. 7(B) or additional nozzles c'' are provided vertically in line with the nozzles c' most closely located to the side tube walls m as shown in FIG. 7(C), thereby increasing the air supplied to the secondary combustion zone in the vicinity of the side tube walls m.

Figure 8:
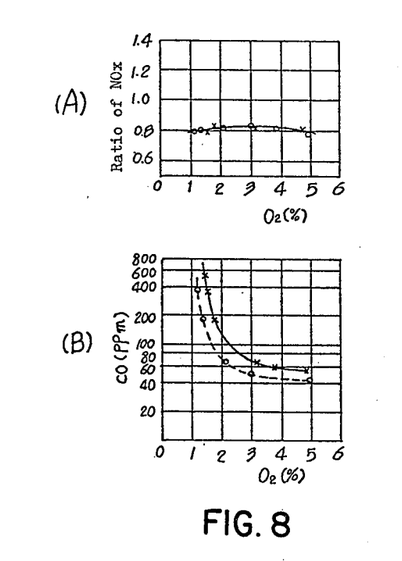
FIG. 8(A) is a graph illustrating the relationship between the oxygen content in % and the ratio of NOx in the exhaust gas discharged from the furnace equipped with the two-stage combustion air ports as shown in FIG. 7 (A) and from the furnace with the prior art two-stage combustion air nozzle arrangement as shown in FIG. 5.
FIG. 8(B) is a graph illustrating the relationship between the oxygen content in % and the carbon monoxide (CO) content in ppm in the exhaust gas discharged from the furnace equipped with the improved two-stage combustion air nozzle as shown in FIG. 7(A) and from the prior art two-stage combustion furnace as shown in FIG. 5.

In the arrangement shown in FIG. 7(A), if the diameter of the nozzle c' is twice that of the nozzles c, the air injected through the nozzle c' is four times as much as the air injected through the nozzle c. Therefore the two-stage combustion air is supplied in sufficient volume to the zones adjacent to the side tube walls m so that, as shown in FIG. 8(B), the quantity of unburned CO (indicated by the broken-line curve) decreases more than the quantity of unburned CO (indicated by the solid line curve) discharged from the furnace of the type shown in FIG. 1. Same is true for the arrangement shown in FIG. 7(B).

However, when the air ratio at the burner is decreased or the bias ratio (which is defined in this specification as "a ratio of the two-stage combustion air to the total combustion air") is increased in order to further reduce the NOx emission, NOx are increased when the bias ratio is increased in excess of a certain point as indicated by the broken line curve in FIG. 9(B). The reason is that the rapid combustion of the unburned CO and the like takes place because a large volume of two-stage combustion air is injected into the zones adjacent to the side tube walls m and consequently a large amount of NOx are produced. Then, as the one of the step of the reduction of NOx produced in the secondary combustion, partial two-stage combustion is considered, which is carried out the combustion of the unburned compounds by dividing finely the secondary combustion zone.

To overcome this problem, there has been devised and demonstrated a method in which the combustion is carried on in more stages as, for instance, shown in FIG. 7(C). Since two vertically spaced apart nozzles (c' and c'') are arranged adjacent to the side tube walls m, the combustion is carried out in two or more stages in the zones adjacent to the side tube walls m so that NOx may be reduced as compared with the arrangements shown in FIGS. 7(A) and 7(B). However, it is extremely difficult to attain such local two-stage combustion as described above because a desired air distribution, which is dependent upon the hole diameter of the nozzles, cannot be attained. Furthermore when the operating conditions are varied, it becomes difficult to supply the air in an optimum valume for the complete combustion of the unburned compounds of which quantity changes with the change in operating conditions. Thus, it is still difficult to reduce NOx to a minimum in the two-stage combustion.

Figure 10:
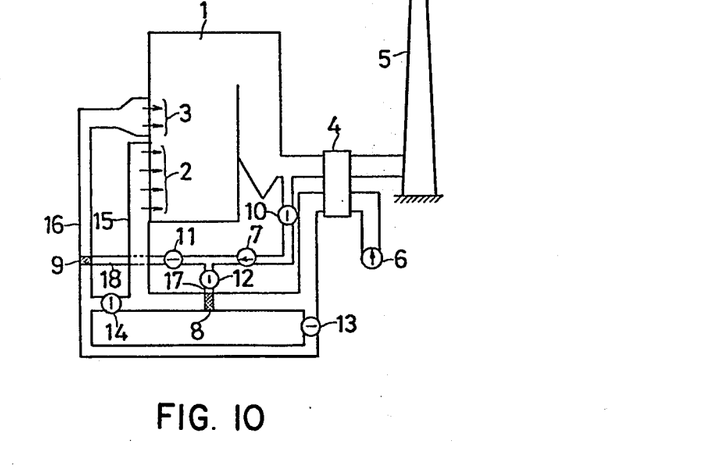
FIG. 10 is a schematic diagram of a first embodiment of a furnace in accordance with the present invention.

The present invention therefore was made to overcome the above and other problems encountered in the prior art furnaces and has for its object to provide a furnace which may reduce the NOx emission to a minimum as practically as possible. The present invention will become apparent from the following description of preferred embodiments thereof taken in conjunction with the accompanying drawings, in which:

FIGS. 7(A), (B) and (C) are views used for the explanation of the modifications, respectively, of the two-stage combustion air nozzles or ports of the furnace shown in FIG. 4;

FIRST EMBODIMENT, FIG. 10

In FIG. 10, reference numeral 1 denotes a boiler furnace; 2, burners; 3, two-stage combustion air ports or nozzles; 4, an air preheater; 5, a stack; 6, a forced draft fan; 7, an exhaust gas recirculation fan; 8 and 9, gas mixers; 10, 11, 12 13, and 14, dampers; 15, a duct for supplying the combustion air to the burners 2; 16, a duct for supplying the two-stage combustion air to the nozzles 3; and 17 and 18, exhaust gas recirculation ducts.

The exhaust gas recirculation duct 17 is communicated with the air duct 15 which in turn is communicated with the burners 2 while the exhaust gas recirculation duct 18 is communicated with the two-stage combustion air duct 16 which in turn is communicated with the two-stage combustion air nozzles 3. The dampers 11 and 12 installed in the ducts 18 and 17 control the flow rate of the exhaust gas.

The primary combustion air is pressurized by the forced draft fan 6 and is heated in the air preheater 4 by the exhaust gas and is branched to flow into the air duct 15 and into the two-stage combustion air duct 16 through the damper 13. The exhaust gas tapped at the upstream of the air preheater 4 is pressurized by the exhaust gas recirculation fan 7 and is branched to flow into the exhaust gas ducts 17 and 18 through the dampers 12 and 11 and is uniformly mixed with the combustion air in the mixers 8 and 9. The mixture of the combustion air and the exhaust gas is supplied through the ducts 15 and 16 to the burners 2 and the two-stage combustion air nozzles.

The flow rate of the exhaust gas to be recirculated may be controlled by the dampers 11 through 14. That is, when the dampers 12 and 13 are opened while the dampers 11 and 14 are closed, the recirculated exhaust gas is mixed only with the combustion air to be supplied to the burners 2 and no exhaust gas is supplied to be mixed with the combustion air to be supplied to the two-stage combustion air nozzles 3. On the other hand when the dampers 11 and 13 are opened while the dampers 12 and 14 are closed, the exhaust gas is mixed only with the two-stage combustion air, but not mixed with the air to be supplied to the burners 2. When the dampers 12 and 14 are opened while the dampers 11 and 13 are closed, the exhaust gas is mixed both with the two-stage combustion air and the air to be supplied to the burners 2. When the dampers 11, 12 and 13 are opened, the damper 14 is closed and the degress of opening of the dampers 11 and 12 are suitably controlled, the volume ratio of the exhaust gas to be mixed with the combustion air to be supplied to the burners 2 to the exhaust gas to be mixed with the two-stage combustion air may be suitably adjusted.

Figure 11:
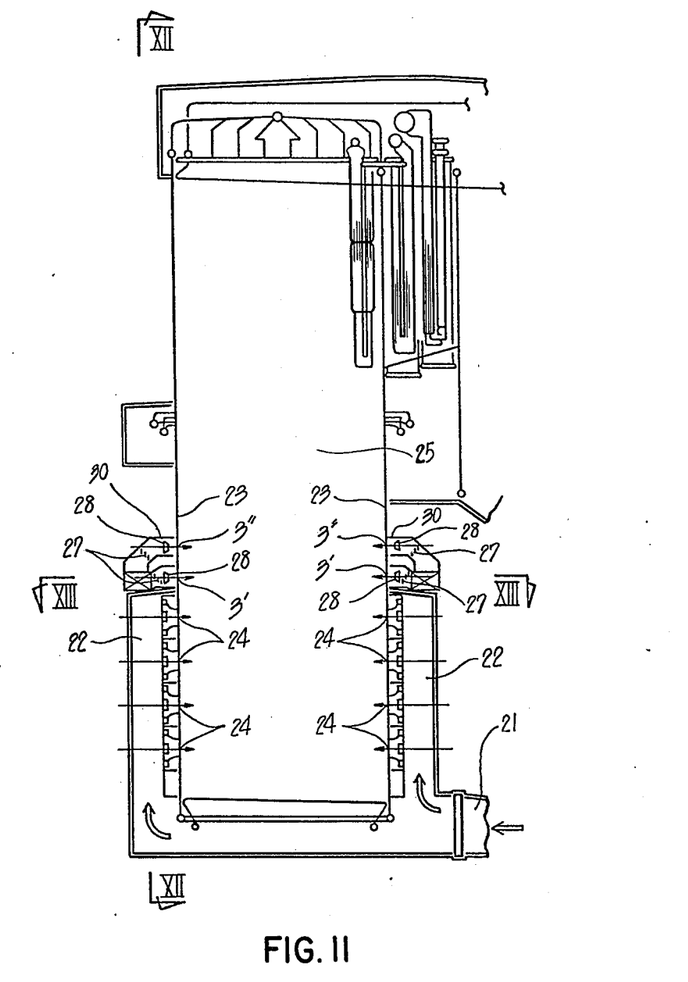
FIG. 11 is a sectional view of a second embodiment of a furnace in accordance with the present invention.
Figure 12:
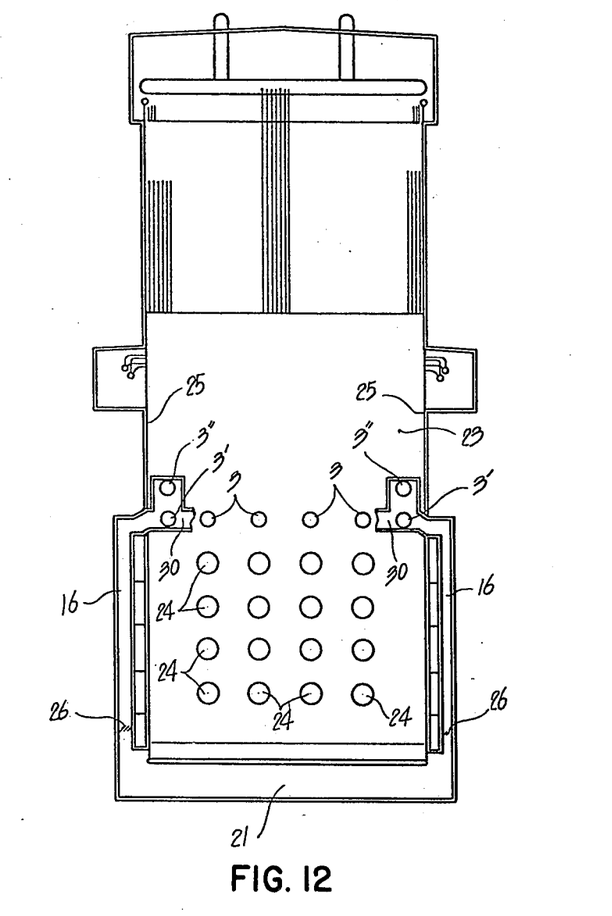
FIGS. 12 and 13 are sectional views taken along the lines XII—XII and XIII—XIII, respectively, of FIG. 11.
Figure 13:
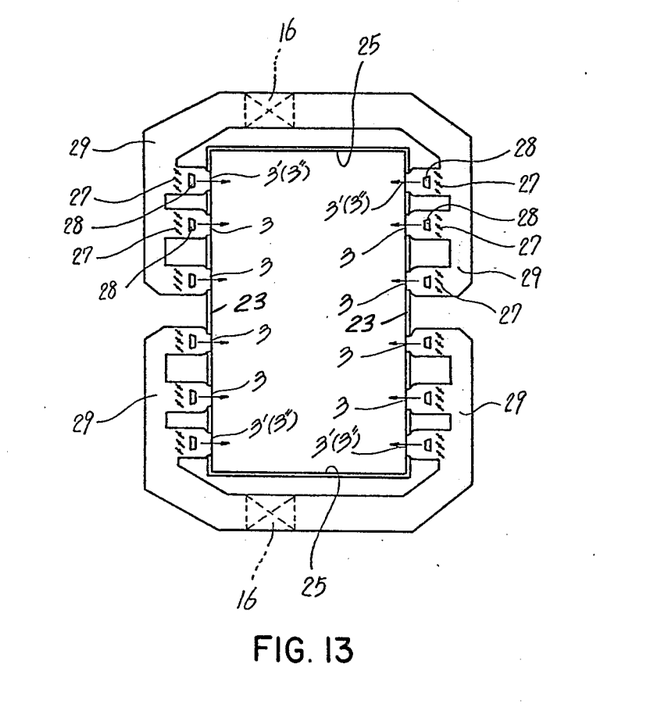

Second Embodiment, FIGS. 11, 12 and 13

The combustion air flowing through an air duct 21 is branched to flow into a two-stage combustion air duct 30 and a burner wind box 22 from which the combustion air is admitted into the combustion chamber through a plurality of burners 24 which are arrayed in columns and rows and equidistantly spaced apart from each other in both the horizontal and vertical directions as shown in FIGS. 11 and 12 and are extended through the tube walls 23 on the burner sides. As shown in FIG. 12, a two-stage combustion air duct 16 is extended upwardly and communicated with the air duct 30 from which the two-stage combustion air is admitted into the furnace through air nozzles 3, 3' and 3" which are formed through the tube walls 23 on the burner sides above the uppermost row of the burners 24. Two-stage combustion air nozzles 3 are spaced apart in the horizontal direction by the nearly equal distance to the interval between the burners 24. They are also spaced apart in the vertical direction from the burners 24 in the uppermost row by the nearly equal distance with the interval between the vertically spaced burners 24 and are in line with the burners 24 in each column. The air nozzle 3' is in line with the air nozzles 3 and is arranged adjacent to the side tube walls 25, and the air nozzle 3" is in line with the air nozzle 3' in the vertical direction and is arranged upwardly of the air nozzle 3'.

A damper 26 which is installed into the air duct 16 controls the flow rate of the primary combustion air flowing into the wind box 22 in communication with the burners 24 and the flow rate of the two-stage combustion air flowing into the air nozzles 3, 3' and 3". A control valve 27 is disposed at the upstream of and very close to the inlet of each air nozzle 3, 3' or 3" for fine adjustment of the flow rate of the two-stage combustion air admitted therethrough. A heat shielding plate 28 is interposed between the control valve 27 and the exit of each air nozzle 3, 3' and 3" in order to shield the control valve 27 and the duct 30 from the direct radiation from the combustion chamber. As best shown in FIG. 13, the two-stage combustion air flows from the air duct 16 into air ducts 29 which are communicated with the air nozzles 3, 3' and 3".

The combustion air flowing through the air duct 21 is controlled by the dampers 26 (See FIG. 12) in such a way that it may be branched at a predetermined ratio to flow into the wind box 22 and the air ducts 16. Alternatively the air distributing may be controlled by the control valves 27.

The combustion air flowing through the wind box 22 is admitted through the burners 24 and is mixed with the fuel for combustion. The two-stage combustion air flowing into the air ducts 16 and 30 is controlled by the control valves 27 and is injected through the air nozzles 3, 3' and 3" into the combustion chamber to sustain the combustion in the secondary combustion zone. Therefore no local high-temperature zone is formed so that the generation of NOx may be suppressed to a minimum.

Figure 9:
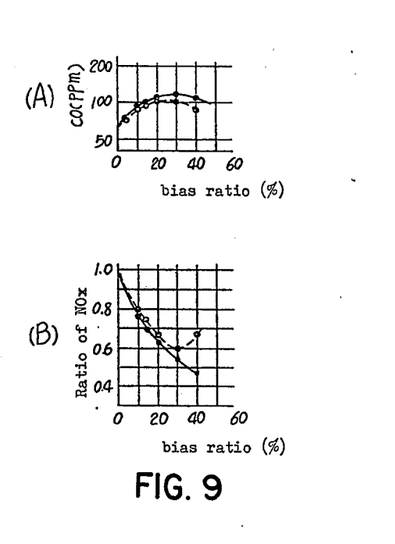
FIG. 9(A) is a graph illustrating the relationship between the bias ratio in % and CO in ppm in the exhaust gas discharged from the furnace with the improved two-stage combustion air nozzle arrangement as shown in FIG. 7(A) and from the furnace of the second embodiment of the present invention.
FIG. 9(B) is a graph illustrating the relationship between the bias ratio in % and the ratio of NOx in the exhaust gas discharged from the furnace with the improved two-stage combustion air nozzle arrangement as shown in FIG. 7(A) and from the furnace of the second embodiment of the present invention.

The performance of the furnace shown in FIGS. 11, 12 and 13 is far superior to that of the furnace with the improved air nozzle arrangement shown in FIG. 7(A) as will be described in detail with reference to FIGS. 9(A) and 9(B). As shown in FIG. 9(A), when the bias ratio is high, the CO emission from the furnace of the present invention is slightly higher than that from the prior art furnace. The CO emission from the furnace of the present invention is indicated by the solid line curve while the CO emission from the prior art furnace, by the broken line curve. In FIG. 9 (B) the ratio of NOx or NOx reduction ratio reaches the minimum or maximum at the bias ratio of 30% in case of the prior art furnace as described previously, and when the bias ratio exceeds, 30%, the ratio of NOx is increased as indicated by the broken line curve. On the other hand, as indicated by the solid line curve, with the increase in bias ratio, relative NOx decrease furthermore by improved air nozzle arrangement because the air distribution through the air nozzles 3' and 3" (that is, those most closely located with respect to the side tube walls 25) can be controlled by the control valves 27. Furthermore the air distributions in both the vertical and horizontal directions through the air nozzles 3, 3' and 3" can be controlled by the control valves 27 so that both the unburned compounds or fuel and NOx may be reduced to a minimum unattainable in the prior art furnaces.

In the second embodiment of the present invention, the air nozzles 3 have been described as being arrayed in one row above the uppermost row of the burners 24, and the air nozzles 3", as being arranged above the air nozzles 3', but it will be understood that the air nozzles 3" may be disposed below the air nozzles 3' and that the air nozzles 3 may be arranged in zig-zag form or staggered with burner. Furthermore the air nozzles 3, 3' and 3" may be arrayed in a plurality of rows. The present invention may be equally applied to any other furnaces other than the boiler furnaces in conjunction with which the invention has been described. Thus it will be understood that variations and modifications may be effected without departing the true spirit of the present invention.

The effects, features and advantages of the present invention may be summarized as follows;

(I) In the first embodiment, the ratio of the exhaust gas to be mixed with the combination air to be supplied to the burners and with the two-stage combustion air to be supplied to the air nozzles may be varied between 0% and a maximum permissible ratio by the dampers depending upon the ratio of NOx produced in the burner section to NOx produced in the secondary combustion zone which ratio in turn is dependent upon the air ratio at the burner, kinds of fuel used, construction of burners and so on. Therefore even through the exhaust gas is recirculated at a predetermined flow rate, the total NOx emission may be reduced to a minimum so far unattainable by any prior art furnaces.

(II) Whereas the exhaust gas mixing ratio is limited in the prior art furnaces, the first embodiment of the present invention permits to provide an optimum mixing ratio in excess of the highest ratio attainable in the prior art furnaces without any adverse effects on the stable combustion so that the generation of NOx may be reduced to a minimum.

(III) According to the second embodiment of the present invention, an optimum two-stage combustion air distribution may be attained depending upon the distribution of unburned compounds in the furnace.

(IV) According to the second embodiment even when the two-stage combustion air is increased in volume; that is, the bias ratio is increased, the distribution of the two-stage combustion air in the furnace may be optimumly controlled so that the generation of NOx due to the secondary combustion may be suppressed to a minimum and accordingly the NOx emission may be reduced considerably.

What is claimed is:

1. A combustion apparatus for carrying out two-stage combustion and exhaust gas recirculation combustion for reducing the emission of nitrogen oxides comprising a plurality of burners, a plurality of two-stage combustion air nozzles, two series of ducts for feeding combustion air to said burners and air nozzles, means for introducing exhaust gases into each of said ducts to mix said gases with the combustion air, a plurality of dampers positioned in said ducts for changing the volume ratio between the exhaust gases and the combustion air, and said dampers controlling the exhaust gas mixture ratio for the two-stage combustion air nozzles and the burners independently of each other, within the range between 0% and 100%, said burners including side walls and being arranged in a plurality of columns and a plurality of rows on said walls, said air nozzles being horizontally disposed in a row at and inwardly of the outermost burner columns and upwardly of the uppermost burner row by a suitable distance, and being spaced apart substantially the same distance as the interval between the burner columns, additional air nozzles disposed in the row of the above mentioned air nozzles and outwardly of the outermost burner columns, and means for controlling the rate of air flow to each air nozzle.

* * * * *